(12) United States Patent
Katukam et al.

(10) Patent No.: US 7,853,715 B1
(45) Date of Patent: *Dec. 14, 2010

(54) METHOD AND APPARATUS FOR COMPUTING A PATH IN A SYSTEM WITH NODAL AND LINK DIVERSE CONSTRAINTS

(75) Inventors: Suresh Katukam, Rohnert Park, CA (US); Venkataraman Anand, Petaluma, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/330,754

(22) Filed: Dec. 9, 2008

Related U.S. Application Data (63) Continuation of application No. 09/909,049, filed on Jul. 18, 2001, now Pat. No. 7,490,165.

(51) Int. Cl.
G06F 15/173 (2006.01)
H04L 1/00 (2006.01)

(52) U.S. Cl. ............ 709/239; 709/242; 370/227; 370/228

(58) Field of Classification Search ......... 709/238–239, 709/241–242; 370/217–225, 238, 351
See application file for complete search history.

(56) References Cited

U.S. PATENT DOCUMENTS

| | | | |
|---|---|---|---|
| 5,253,248 A | 10/1993 | Dravida et al. | |
| 5,459,716 A | 10/1995 | Fahim et al. | |
| 5,467,345 A | 11/1995 | Cutler, Jr. et al. | |
| 5,497,368 A | 3/1996 | Reijnierse et al. | |
| 5,627,822 A | 5/1997 | Edmaier et al. | |
| 5,771,227 A | 6/1998 | Benayoun et al. | |
| 5,819,043 A | 10/1998 | Baugher et al. | |
| 5,832,196 A | 11/1998 | Croslin et al. | |
| 5,838,660 A | 11/1998 | Croslin | |
| 5,854,899 A | 12/1998 | Callon et al. | |
| 5,883,881 A | 3/1999 | Croslin | |
| 5,987,521 A | 11/1999 | Arrowood et al. | |
| 6,026,077 A | 2/2000 | Iwata | |
| 6,034,961 A | 3/2000 | Masuo et al. | |
| 6,073,248 A | 6/2000 | Doshi et al. | |
| 6,078,590 A | 6/2000 | Farinacci et al. | |
| 6,185,210 B1 | 2/2001 | Troxel | |
| 6,430,150 B1 | 8/2002 | Azuma et al. | |
| 6,563,798 B1 | 5/2003 | Cheng | |
| 6,751,190 B1 | 6/2004 | Swallow | |
| 6,765,880 B1 | 7/2004 | Hillard et al. | |
| 6,857,026 B1 | 2/2005 | Cain | |
| 6,904,462 B1 | 6/2005 | Sinha | |
| 6,914,912 B1 | 7/2005 | Skalecki et al. | |
| 6,982,951 B2 | 1/2006 | Doverspike et al. | |
| 2001/0032271 A1 | 10/2001 | Allen | |
| 2002/0112072 A1* | 8/2002 | Jain | 709/239 |

* cited by examiner

*Primary Examiner*—Philip J Chea (57) ABSTRACT

Methods and apparatus for defining an alternate circuit path within a network given nodal diverse or link diverse constraints are disclosed. According to one aspect of the present invention, a device for computing circuit paths between a first node and a second node within a network that has a plurality of elements includes a route generator and a list mechanism. The route generator computes a primary circuit path between the first node and the second node such that the primary circuit path includes a first element. The list mechanism identifies the first element as being inaccessible to an alternate circuit path. Using the list mechanism, the route generator computes an alternate circuit path that does not include the first element identified by the list mechanism. In one embodiment, the first element is a link. In another embodiment, the first element is a node.

13 Claims, 9 Drawing Sheets

METHOD AND APPARATUS FOR COMPUTING A PATH IN A SYSTEM WITH NODAL AND LINK DIVERSE CONSTRAINTS

CROSS-REFERENCE TO RELATED APPLICATIONS

The present application is a continuation of U.S. application Ser. No. 09/909,049 filed Jul. 18, 2001, the contents of which are incorporated by reference herein in their entirety for all purposes.

BACKGROUND OF THE INVENTION

1. Field of Invention

The present invention relates generally to data communication systems. More particularly, the present invention relates to systems and methods for substantially automating the computation of an alternate circuit path, which corresponds to a primary circuit path, given specified constraints.

2. Description of the Related Art

The demand for data communication services is growing at an explosive rate. Much of the increased demand is due to the fact that more residential and business computer users are becoming connected to the Internet. Furthermore, the types of traffic being carried by the Internet are shifting from lower bandwidth applications towards high bandwidth applications which include voice traffic and video traffic.

To address the demand for data communication services, the use of optical networks, such as a synchronous optical network (SONET) is becoming more prevalent. One type of SONET network, or one type of network that is subject to SONET standards, is a time division multiple access (TDM) network. TDM networks generally allocate single channels or lines to be used amongst multiple users, or customers of data communication services. The single channels may each be divided into slots of time during which each user has access to the single channels. Many TDM networks may be configured to include a path protected mesh network (PPMN). A PPMN is a mesh of unprotected links with substantially no physical topological constraint. One example of a PPMN is a unidirectional path-switched ring (UPSR), which is effectively a PPMN with a ring-like topology. A UPSR or a virtual UPSR in a PPMN, as will be appreciated by those skilled in the art, provides for two different paths between a source and a destination. The source and the destination each select traffic from one of the paths based upon, for example, signal presence and signal quality.

Although a network such as a TDM network is generally designed to ensure that information may be transferred within the network reliably, there are times where network components may fail. Failures of network components may cause received signals to have a relatively high bit-error rate or, in some cases, cause a signal to be completely lost. In SONET, mechanical failures and equipment failures may occur. Mechanical failures include the effects of vibrations which affect optical connections, and bends in links or fibers which may result in degraded signal levels. Equipment failures may include, but are not limited to, failures of lasers which transmit optical signals, failures of links or channels over which signals are transmitted, and failures of nodes which are interconnected by links.

Figure 1A:
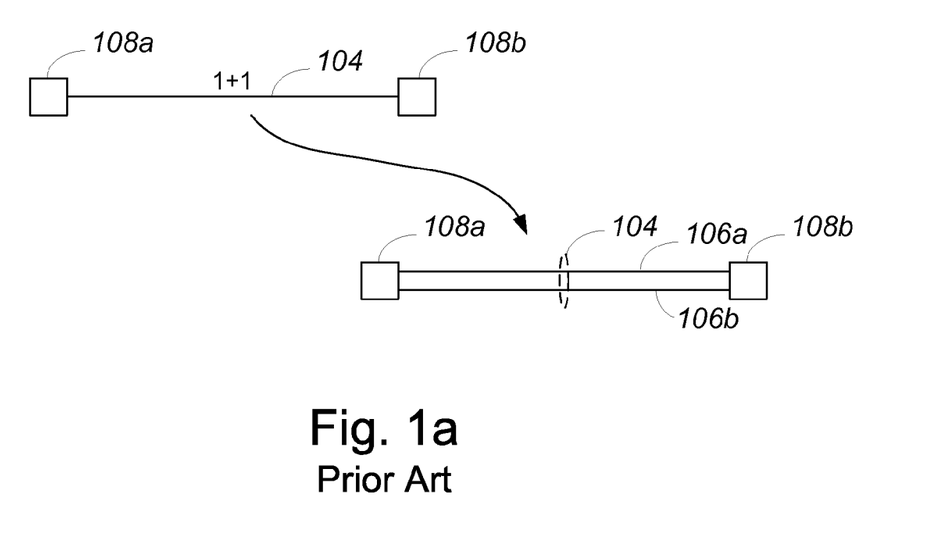
FIG. 1a is a diagrammatic representation of nodes that are connected by a protected link.

In order to compensate for link failures, links may be protected. A protected link is a link which has two fibers or cables over which signals may be transmitted substantially simultaneously. One example of a protected link is a link with "1+1" protection, as shown in FIG. 1a. A link 104 with 1+1 protection, i.e., a protected link, is a link between two nodes 108 that is made up of two unprotected links 106, i.e., sub-links. When an optical signal is to be transferred across protected link 104, the optical signal is transferred across both sub-links 106. That is, the optical signal is transferred redundantly across both sub-links 106. The use of two sub-links 106 within protected link 104 enables a choice to be made regarding which optical signal received on node 108b is to be accepted by node 108b. Typically, the signal with the lower bit-error rate is accepted.

Figure 1B:
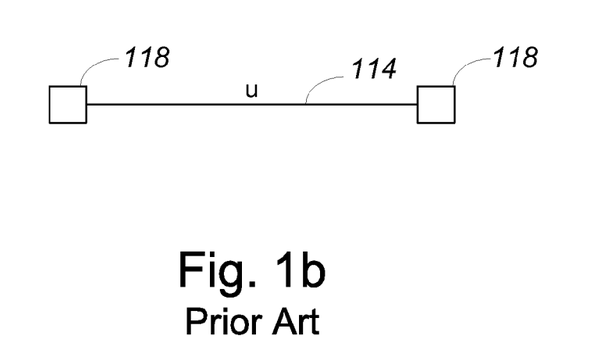
FIG. 1b is a diagrammatic representation of nodes that are connected by an unprotected link.

Some links between nodes are unprotected as it is generally less expensive to transfer signals across an unprotected link than it is to transfer signals across a protected link. As shown in FIG. 1b, nodes 118 are in communication across an unprotected link 114. While an unprotected link 114 typically enables data to be transferred successfully, if unprotected link 114 fails, then there is no alternate link over which data may be transferred between nodes 118.

Figure 1C:
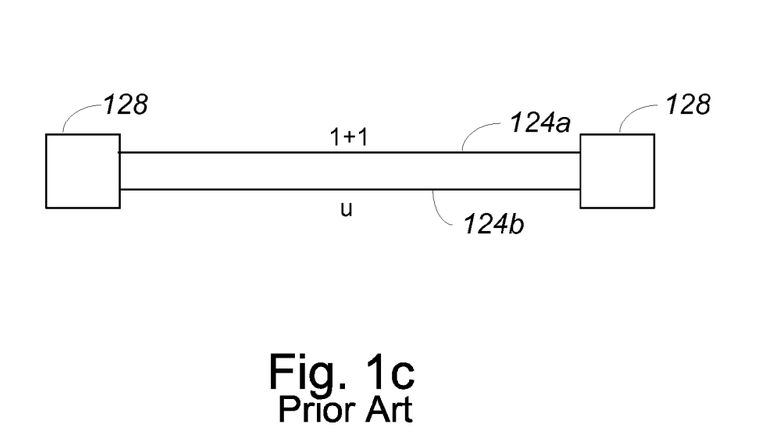
FIG. 1c is a diagrammatic representation of nodes that are connected by both a protected link and an unprotected link.

In general, nodes may have many links therebetween. FIG. 1c is a diagrammatic representation of nodes that are connected by both a protected link and an unprotected link, e.g., in a mixed protection domain. Nodes 128 are connected by a protected link 124a and an unprotected link 124b. As discussed above with respect to FIG. 1a, protected link 124a may include two unprotected sub-links. In some cases, when no protection is desired, unprotected link 124b may be used to transfer data between nodes 128. When a protected path is desired, protected link 124a may be used to route a data signal. As protected link 124a has 1+1 protection, if one of the sub-links in protected link 124a fails, the signal may still be transmitted over the other sub-link of protected link 124a.

As previously mentioned, protected links and/or multiple links may be implemented between two nodes to protect against link failures, i.e., to prevent a link failure from causing a signal to be completely lost. In other words, a redundant scheme of links allows the reliability of an overall network to be improved. However, a redundant scheme of links does not compensate for node failures.

Figure 2A:
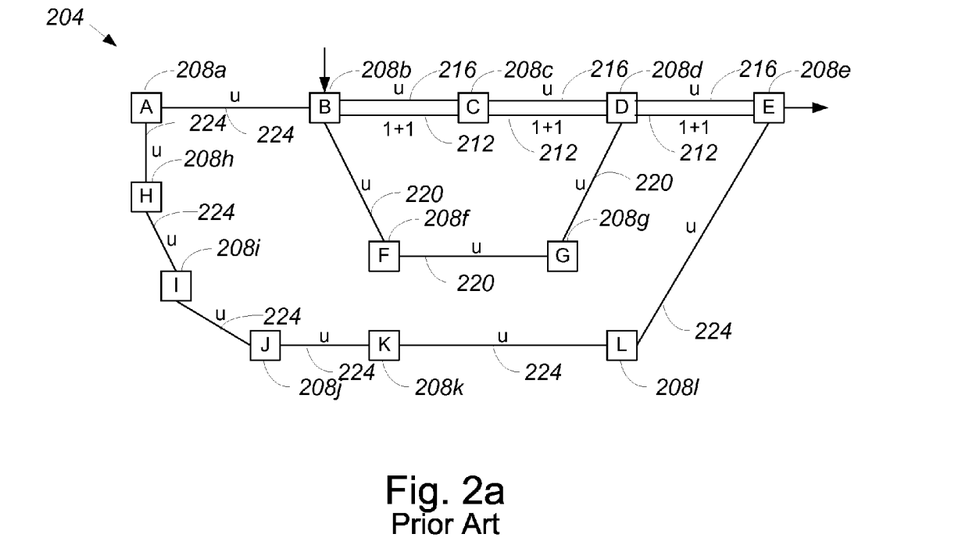
FIG. 2a is a diagrammatic representation of a network.

FIG. 2a is a diagrammatic representation of a TDM network which includes nodes and links. Within a TDM network 204, if a signal is to be transmitted between a source node B 208b and a destination node E 208e, a customer may specify to a network administrator whether he prefers a protected path or an unprotected path. If a protected path is requested, then protected links 212 may be used to for a protected path. Alternatively, if a customer wants a protected circuit that uses unprotected links, than a virtual UPSR in a PPMN, e.g., a primary path and an alternate path that form a ring-like UPSR at a circuit level, may be used. If the cost of transferring information across protected links 212 is more than that of transferring information across unprotected links 216, then a customer may decide whether to incur the additional cost associated with protected links 212, or to use unprotected links 216.

Typically, when a protected path is desired between source node B 208b and destination node E 208e, if protected links are available, the protected links are selected for inclusion in a path. However, when protected links such as links 212 are unavailable for use, e.g., when there is no available bandwidth on links 212, at least switched unprotected path between source node B 208b and destination node E 208e which has a corresponding alternate path is desired. In other words, a path which uses the fewest number of nodes 208, which function as switches, to reach destination node E 208e and has a corresponding alternate path is preferred when protected links 212 are unavailable. Such a path is generally considered to be the shortest available path between node B 208b and node E 208e. Hence, although an unprotected path from source node B 208b to destination node E 208e is also available using unprotected links 220, as well as through unprotected links 224, the use of unprotected links 216 is preferred. It should be understood, however, that if enough bandwidth is not available in the path through links 216, paths through either links 220 or links 224 may be used instead.

If a path through links 216 is a primary circuit path or, more specifically, a segment of a primary circuit path that exists between node B 208b and node E 208e, then an alternate circuit path may be defined between node B 208b and node E 208e to protect against failures associated with the primary circuit path. For instance, an alternate circuit path between node B 208b and node E 208e may be defined through links 220 and one link 216 which connects node D 208d and node E 208e.

Although the alternate circuit path through links 220, in cooperation with link 216 between node D 208d and node E 208e is generally suitable, in order to maintain link diversity, an alternate circuit path through links 224 is more suitable. An alternate circuit path that uses links 220 does not comply with a link diverse constraint, since a failure of link 216 between nodes D 208d and node E 208e would result in a failure of both the primary circuit path and the alternate circuit path.

An alternate circuit path that uses links 224 is also suitable for use if network 204 requires a nodal diverse constraint, since no nodes 208, other than source node B 208b and destination node E 208e, are shared between the primary circuit path and the alternate circuit path that uses links 224. Hence, if one of node C 208c or node D 208d suffers a failure, the alternate circuit path would not be affected.

Figure 2B:
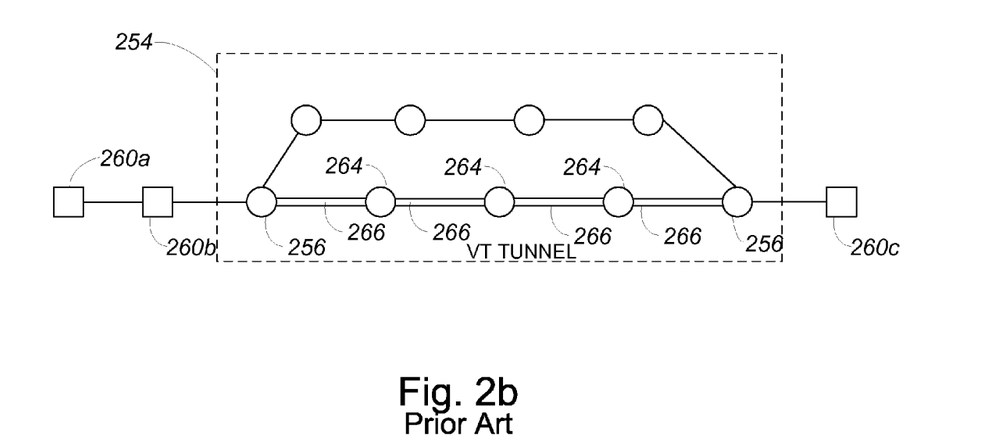
FIG. 2b is a diagrammatic representation of a tunnel.

As will be appreciated by those skilled in the art, some links between nodes may be tunnels, e.g., VT tunnels. A tunnel is typically a bigger traffic or circuit pipe between two nodes with intermediate nodes switching at the bigger pipe level without looking at the pipe. Future traffic that is compatible with the pipe may be routed through a tunnel. FIG. 2b is a diagrammatic representation of a tunnel. A tunnel 254 includes XCVT points 256, and enables traffic, as for example VT traffic, to be passed therethrough. Tunnel 254 is generally linked to nodes 260 such that signals may be transmitted from node 260b to node 260c through tunnel 254. However, nodes 260 are not aware of how many internal nodes 264 exist as a part of tunnel 254. In general, an alternate tunnel for traffic may be needed to compensate for a failure of either or both internal nodes 264 of tunnel 254 or internal links 266 of tunnel 254.

The process of creating an alternate circuit path within a TDM network that is either nodal diverse or link diverse is often needed, as overall protected circuits, or circuits with path redundancy, are often requested, e.g., by network customers. In addition to creating circuit paths that are nodal diverse or link diverse, SONET standards, as previously mentioned, specify that a UPSR may not have any network links that are protected. Hence, to create an alternate circuit path within a TDM network that includes a UPSR and is subject to a nodal diverse constraint, all nodes included in a primary circuit path, along with all protected links, must be identified and eliminated from a routing process. Protected links are removed from consideration to prevent nested protection domains. Conventionally, a network administrator must manually specify an alternate circuit path that does not include nodes associated with a primary circuit path or protected links, which is often time consuming and tedious, especially when a TDM network is large and complex. Likewise, for a TDM network that is subject to a link diverse constraint, the network administrator must manually specify an alternate circuit path that does not include either protected links or links which were used to create the alternate circuit path. In addition to being a time consuming process, manually specifying an alternate circuit path may result in a node associated with a primary circuit path, a link associated with the primary circuit path, or a protected link being inadvertently included in the alternate circuit path due to human error.

Therefore, what is needed is an efficient method and apparatus for creating alternate circuit paths which correspond to primary circuit paths. That is, what is desired is an efficient and accurate system which enables alternate circuit paths which are either nodal diverse of link diverse, and do not include protected links, to be created.

BRIEF SUMMARY OF THE INVENTION

The present invention relates to defining an alternate circuit path within a network given constraints with respect to available network elements. According to one aspect of the present invention, a device for computing circuit paths between a first node and a second node within a network that has a plurality of elements includes a route generator and a list mechanism. The route generator generates or computes a primary circuit path between the first node and the second node such that the primary circuit path includes a first element selected from the plurality of elements. The list mechanism identifies the first element as being inaccessible to an alternate circuit path. Using the list mechanism, the route generator generates or computes an alternate circuit path that does not include the first element identified by the list mechanism. In one embodiment, the first element is either a link or a node.

In another embodiment, the route generator generates the primary circuit path such that the primary circuit path includes the first element as well as a set of elements selected from the plurality of elements. In such an embodiment, the list mechanism identifies the first element and the set of elements as being inaccessible for use in generating the alternate circuit path.

A device, such as a computer or a node in a network, which enables an alternate path to be created between two nodes which have an associated primary path such that the alternate path is either nodal diverse or link diverse allows for increased protection against network failures to be efficiently achieved. By substantially automating the process of creating an alternate path between nodes while accounting for constraints, including constraints associated synchronous optical network (SONET) standards, the burden of manually creating a diverse alternate path which also accounts for SONET standards is effectively removed. Hence, the accuracy with which a diverse alternate path may be improved, while the amount of time associated with creating the alternate path may be significantly reduced.

According to another aspect of the present invention, an element that is suitable for use in an optical network that has a plurality of nodes including a destination node, as well as a plurality of links, includes a route generator that computes a first circuit path between the element and the destination node. The first circuit path includes a first link included in the plurality of links. The element also includes a list which stores a plurality of identifiers that identify selected links included in the plurality of links. The plurality of identifiers include a first identifier that identifies the first link. The route generator computes a second circuit path between the element and the destination node using the list such that the second circuit path includes a second link included in the plurality of links and does not include the selected links identified by the plurality of identifiers included in the list.

In one embodiment, the route generator is further arranged to identify the first link, to create the first identifier that identifies the first link, and to place the first identifier that identifies the first link in the list. In such an embodiment, the route generator may also generate the plurality of identifiers that identify the selected links included in the plurality of links, and place the plurality of identifiers that identify the selected links included in the list.

According to still another aspect of the present invention, an element for use in an optical network that includes a plurality of nodes and a plurality of links includes a route generator and a list mechanism. The route generator computes a first circuit path between the element and a destination node that is included in the optical network. The first circuit path includes a first node that is included in the plurality of nodes. The list mechanism includes a first identifier that identifies the first node, and the route generator computes a second circuit path between the element and the destination node using the list. The second circuit path includes a second node included in the plurality of links and does not include the first node. In one embodiment, the element is a source node.

In accordance with still another aspect of the present invention, a method for computing an alternate circuit path that corresponds to a primary circuit path that is defined between a start node and an end node of a network, and includes a first network element selected from a plurality of network elements, includes identifying the first network element as not be accessible to the alternate circuit path. Such an identification may be made by a path routing algorithm. The method also includes creating the alternate circuit path using the routing algorithm such that the first network element is not included in the alternate circuit path while at least one other network element selected from the plurality of elements is included.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which.

DETAILED DESCRIPTION OF THE INVENTION

In order to provide protection for a primary circuit path within a network such as a time division multiple access (TDM) network that is subject to synchronous optical network (SONET) standards, a network administrator may specify that a corresponding alternate circuit path is either nodal diverse or link diverse. SONET standards also specify that a unidirectional path-switched ring (UPSR) within a TDM network may not include protected links. That is, protected links may not be included in segments of a circuit path that are associated with a UPSR or, more generally, a path protected mesh network (PPMN). The identification of an alternate circuit path which accounts for the nodal diverse or link diverse constraints, while avoiding protected links, is often a manual, time-intensive task for a network administrator.

Substantially automating the computation of an alternate circuit path once a user such as a network administrator specifies either a nodal diverse constraint or a link diverse constraint enables alternate circuit paths to be computed efficiently. In other words, a path routing process which substantially automatically eliminates some nodes or links, as appropriate, from consideration in defining an alternate circuit path allows alternate circuit paths which meet SONET standards for a TDM network to be readily created.

Eliminating nodes, e.g., switches, that are included in a primary circuit path between a source node and a destination node from being available to an alternate circuit path prevents a node failure of a node included in the primary circuit path from affecting the alternate circuit path. Similarly, eliminating links, e.g., fibers, that are included in a primary circuit path from being available to an alternate circuit path prevents a link failure associated with the primary circuit path from affecting the alternate circuit path. The ability to efficiently generate an alternate circuit path that is either nodal diverse or link diverse with respect to a corresponding primary circuit path allows alternate circuit paths to be quickly implemented for use, thereby reducing the overall amount of time associated with initiating the transmission of data between a source node and a destination node. Further, substantially automating the process of generating an alternate circuit path may reduce the likelihood of accidentally or inadvertently including an inappropriate element in the alternate circuit path. Inappropriate elements may include, but are not limited to, protected links, nodes that are included in a corresponding primary circuit path, and links that are included in the corresponding primary circuit path.

As will be understood by those skilled in the art, a network often includes both protected, e.g., 1+1 or bi-directional line switched ring protected, and unprotected links. Nodal diverse and link diverse constraints generally apply only to PPMN portions of a circuit. Specifically, if a network includes both protected links and unprotected links, nodal diverse and link diverse constraints apply only with respect to the portion of a circuit path that is routed using unprotected links. That is, when a path of a circuit traverses more than one protection domain, nodal diverse and link diverse constraints apply substantially only to the PPMN portion of the circuit. Alternatively, if a network is made up substantially entirely of unprotected links, e.g., a network is completely a PPMN, then nodal diverse and link diverse constraints generally apply to the entire path of a circuit.

Figure 3A:
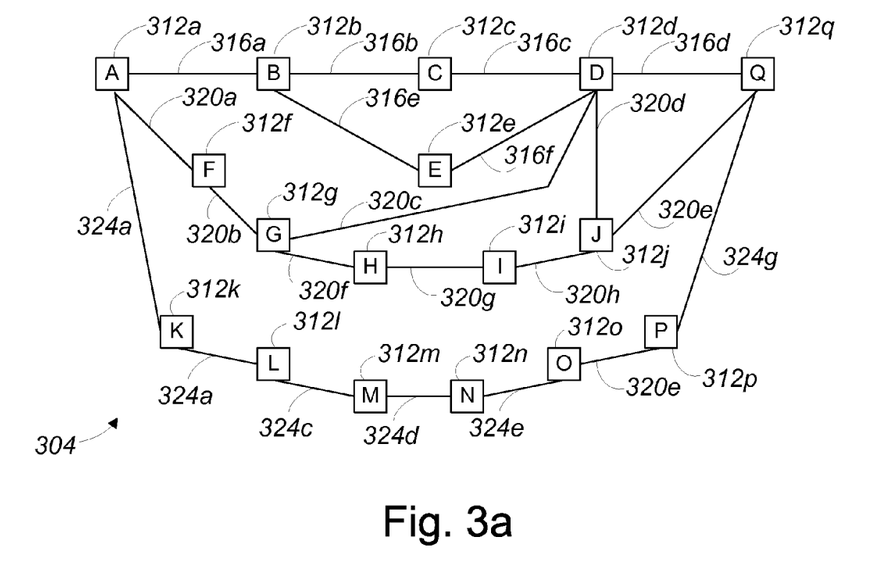
FIG. 3a is a diagrammatic representation of a network within which paths may be computed in accordance with an embodiment of the present invention.

FIG. 3a is a diagrammatic representation of a network of nodes and links within which paths may be computed in accordance with an embodiment of the present invention. A network 304, which may be a TDM network, includes nodes 312 and links 316, 320, 324. In the described embodiment, a primary circuit path is desired between a source node A 312a and a destination node Q 312q. Typically, the primary circuit path may be the shortest path, e.g., the path including the fewest number of links, between node A 312a and node Q 312q, as determined by a "shortest path first" algorithm. It should be appreciated, however, that the primary circuit path is not necessarily the shortest path between a start node, e.g., node A 312a, and an end node, e.g., node Q 312q. For instance, when the computation of a primary circuit path accounts for load balancing, the computer primary circuit path may not be the shortest, or least-switched, path. Also, when a primary circuit path is expected to be unprotected, as for example when the primary circuit path is as a part of a UPSR or includes a part of a UPSR, then the primary circuit path may not be the shortest path if the shortest path includes protected links.

Generally, a primary circuit path may include both protected segments and unprotected segments. In other words, a primary circuit path may include a set of contiguous links that are protected, as well as a set of contiguous links that are unprotected. In addition, a primary circuit path may include unprotected links and have a corresponding alternate circuit path which also includes unprotected links. When considered together, the primary and alternate circuit paths provide a protected circuit path. Herein and after, for purposes of discussion, a primary circuit path will refer to a single set of links or a single segment, i.e., a primary circuit path will either be completely protected or completely unprotected, for ease of discussion. It should be appreciated, however, that a primary circuit path between node A 312a and node Q 312q may actually be a segment of an overall primary circuit path between nodes (not shown) that are linked to node A 312a and node Q 312q from outside of network 304.

Figure 3B:
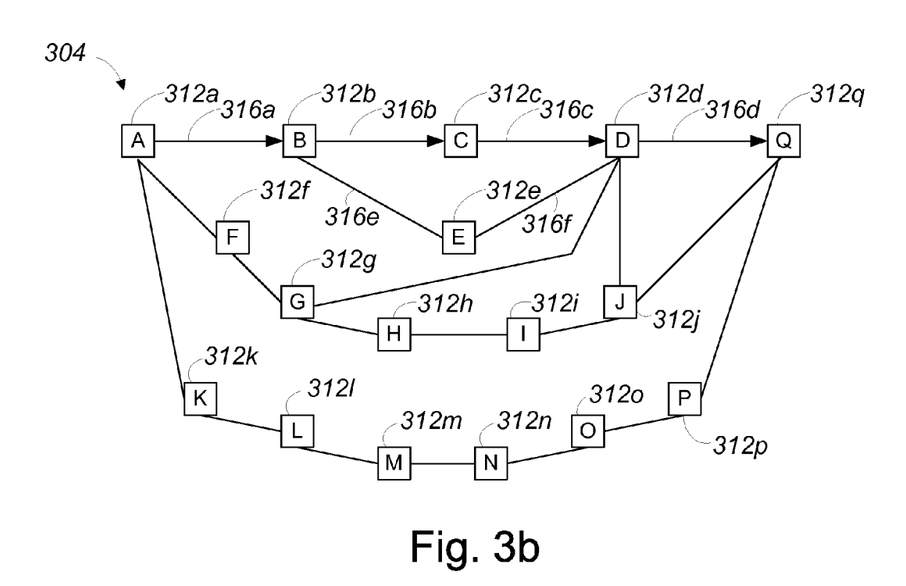
FIG. 3b is a diagrammatic representation of a network, i.e., network 304 of FIG. 3a, in which a primary circuit path has been identified in accordance with an embodiment of the present invention.

Referring next to FIG. 3b, network 304 is shown as including a primary circuit path between node A 312a and node Q 312q. The primary circuit path includes links 316a-d, and intermediate nodes, namely node B 312b, node C 312c, and node D 312d. As links 316a-d are all included in the primary circuit path, links 316a-d are all of substantially the same link type. That is, links 316a-d are either all protected links or all unprotected links. In the described embodiment, links 316a-d are unprotected links which may be part of a UPSR. Therefore, links 316a-d may effectively be considered as an unprotected segment of the primary path.

While the primary circuit path between node A 312a and node Q 312q that includes four links 312a-d is the shortest or least-switched path possible between node A 312a and node Q 312q, there is another potential path between node A 312a and node Q 312q that is the same "length" as, or passes through, the same number of intermediate nodes 312 as, the primary circuit path. That is, there is a potential path between node A 312a and node Q 312q which includes the same number of links 316 and intermediate nodes 312 as the primary circuit path. As shown, a path from node A 312a to node Q 312q which uses node B 312b, node E 312e, and node D 312d is substantially the same length as the primary circuit path. In general, when two paths have substantially the same length, one path may be chosen over the other path for a variety of reasons. For instance, the choice of the path may be based upon the protection associated with the links in the path. Alternatively, a particular path may be chosen over another for load balancing reasons or bandwidth allocation reasons. The choice may also be arbitrary, if all other factors are substantially the same.

An alternate circuit path may often be computed between node A 312a and node Q 312q. In particular, an alternate circuit path may be computed when the primary circuit path is unprotected. By computing an alternate circuit path, in the event of a failure associated with the primary circuit path, e.g., a link goes down or a node fails, a signal may be received by node Q 312q from node A 312a through the alternate circuit path. In other words, an alternate circuit path may be considered to be a back-up path to the primary circuit path, as discussed above.

In computing an alternate circuit path, a variety of different constraints may be considered. Typically, constraints associated with network 304, such as those associated with SONET standards, may be accounted for in the computation of an alternate circuit path. For example, SONET standards specify that a UPSR may not include any protected links. Other constraints may relate to maintaining diversity between primary circuit paths and alternate circuit paths. Constraints relating to diversity may include link diverse constraints and nodal diverse constraints.

A link diverse constraint typically provides protection from link failures within a primary circuit path. In general, an alternate path that is computed while accounting for a link diverse constraint will not include any links which were included in the primary path. The creation of an alternate path which is computed using a link diverse constraint will be described below with reference to FIG. 3c. A nodal diverse constraint typically provides protection from nodal failures within a primary circuit path. When an alternate path is computed taking nodal diverse constraints into consideration, the alternate path will not include any nodes that were included in the primary path. The creation of an alternate path which is computed using nodal diverse constraints will be discussed below with respect to FIG. 3d.

Figure 3C:
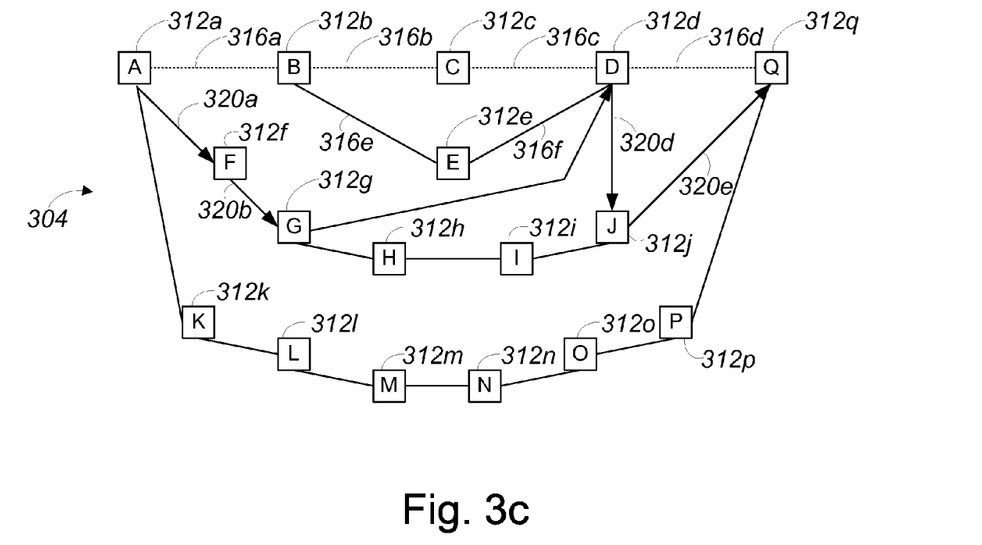
FIG. 3c is a diagrammatic representation of a network, i.e., network 304 of FIG. 3a, in which an alternate circuit path has been computed using a link diverse constraint in accordance with an embodiment of the present invention.

FIG. 3c is diagrammatic representation of network 304 which includes an alternate circuit path that is computed using a link diverse constraint in accordance with an embodiment of the present invention. When an alternate circuit path is computed using a link diverse constraint, links which are included in the corresponding primary path, which was described above with respect to FIG. 3b, are essentially eliminated from a "pool" or list of links which are available for use in creating the alternate circuit path. In the described embodiment, links 316a-d are eliminated from being used in creating an alternate circuit path. That is, in creating an alternate circuit path, links 316a-d are effectively considered to be non-existent, as shown.

While an alternate circuit path may be the path that is closest in length to the primary circuit path, factors may prevent the alternate circuit path from being effectively the second shortest circuit path between node A 312a and node Q 312q. For instance, the second shortest circuit path between node A 312*a* and node Q 312*q*, as shown, would actually be a circuit path which includes link 316*a*, link 316*e*, link 316*f*, and link 316*d*. However, since link 316*a* and link 316*d* are not available for use in creating an alternate circuit path because of the link diverse constraint, the second shortest circuit path between node A 312*a* and node Q 312*q* is not a suitable alternate circuit path. A suitable alternate circuit path between node A 312*a* and node Q 312*q* may include node F 312*f*, node G 312*g*, node D 312*d*, and node J 312*j*. Hence, the alternate circuit path includes links 320*a-e*.

Figure 3D:
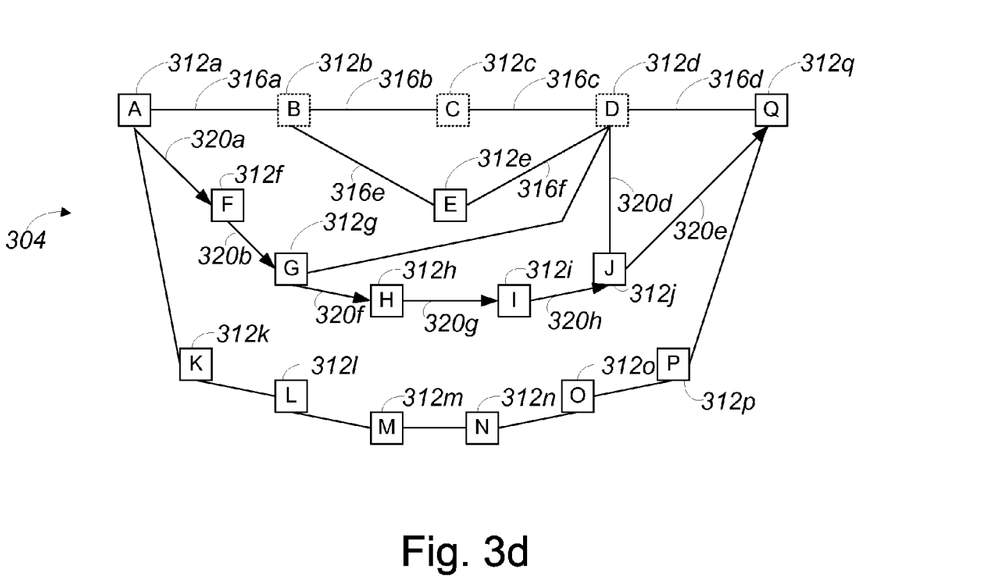
FIG. 3d is a diagrammatic representation of a network, i.e., network 304 of FIG. 3a, in which an alternate circuit path has been computed using a nodal diverse constraint in accordance with an embodiment of the present invention.

As discussed above, when it is specified that the computation of an alternate circuit path is based on nodal diverse constraints, nodes 312 which are included in the primary circuit path are blocked or otherwise prevented from being included in an alternate circuit path. Specifying a set of nodes 312, namely nodes 312*b-d*, which are to be eliminated from consideration as components of an alternate circuit path may include listing the nodes in a blocked nodes list.

With reference to FIG. 3*d*, the computation of an alternate circuit path which is based at least in part upon nodal diverse constraints will be described in accordance with an embodiment of the present invention. As shown, node B 312*b*, node C 312*c*, and node D 312*d*, which are all included in the primary circuit path shown in FIG. 3*b*, are blocked from being used in the computation of an alternate circuit path. The blockage of node B 312*b*, node C 312*c*, and node D 312*d* prevents an alternate circuit path which would use any links which are associated with node B 312*b*, node C 312*c*, and node D 312*d* from being created. Hence, any failure of node B 312*b*, node C 312*c*, or node D 312*d* would not affect the use of the alternate circuit path.

A path which includes node F 312*f*, node G 312*g*, node H 312*h*, node I 312*i*, and node J 312*j*, as well as link 320*a*, link 320*b*, link 320*f*, link 320*g*, link 320*h*, and link 320*e*, may be a suitable alternate circuit path. In the described embodiment, the alternate circuit path which includes node F 312*f*, node G 312*g*, node H 312*h*, node I 312*i*, and node J 312*j* has the fewest links and nodes 312 of any alternate path which does not include node B 312*b*, node C 312*c*, or node D 312*d*.

Since an alternate circuit path is an unprotected path, in order for link 320*a*, link 320*b*, link 320*f*, link 320*g*, link 320*h*, and link 320*e* to be included in the alternate circuit path, link 320*a*, link 320*b*, link 320*f*, link 320*g*, link 320*h*, and link 320*e* are all unprotected links. In the event that one of link 320*a*, link 320*b*, link 320*f*, link 320*g*, link 320*h*, and link 320*e* is protected, as for example link 320*g* as shown in FIG. 3*e*, then an alternate circuit path between node A 312*a* and node Q 312*q* which accounts for a nodal diverse constraint may not include link 320*g*.

Figure 3E:
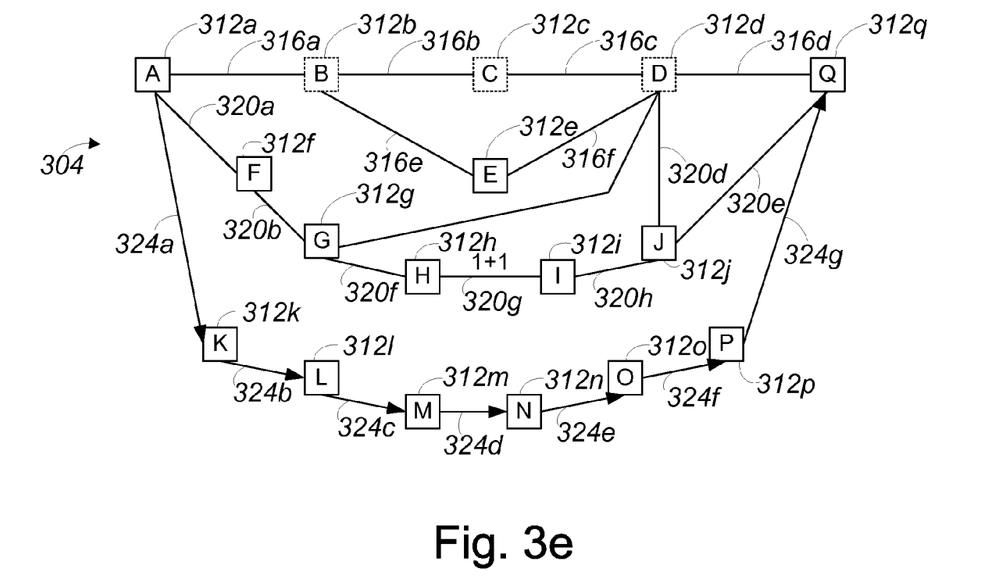
FIG. 3e is a diagrammatic representation of a network, i.e., network 304 of FIG. 3a, in which an alternate circuit path has been computed using a link diverse constraint in accordance with another embodiment of the present invention.

When link 320*g* is protected, as for example by 1+1 protection or BLSR protection, and node B 312*b*, node C 312*c*, and node D 312*d* are blocked, as shown in FIG. 3*e*, an alternate circuit path between node A 312*a* and node Q 312*q* differs from the alternate circuit path discussed above with reference to FIG. 3*d*. The alternate circuit path in such a case, i.e., when link 320*g* is protected and nodal diverse constraints are in effect, includes node K 312*k*, node L 3121, node M 312*m*, node N 312*n*, node O 312*o*, and node P 312*p*, and links 324*a-g*, which are unprotected. In this case, the alternate circuit path is relatively long and is, in fact, the only available alternate circuit path, given the constraints. As previously mentioned, protected link 320*g* may not be included in the calculation of an alternate circuit path since including protected link 320*g* will result in a nested protection scheme.

In general, an alternate circuit path may be computed substantially automatically, i.e., with relatively little input if any from a network administrator or a user. That is, in lieu of having a network administrator specify an entire alternate circuit path manually, substantially the entire alternate circuit path may be defined automatically using a routing algorithm, with minimal input from the network administrator. For example, the network administrator may provide input specifying whether an alternate circuit path should be nodal diverse or link diverse. The network administrator may also provide input to a routing algorithm which relates to whether load characteristics should be accounted for in defining the alternate circuit path, or whether bandwidth on links should be considered in defining the alternate circuit path. The input may either be provided to a routing algorithm associated with a computer which is in communication with at least one node in a network, or substantially directly to a node with an associated routing algorithm. It should be appreciated that in the described embodiment, a network administrator generally does not provide any input regarding load characteristics or bandwidth. A system in which an alternate circuit path is defined by a computer that is in communication with a network will be described below with respect to FIG. 4*a*, while a system in which an alternate circuit path is defined by a node in a network will be described below with respect to FIG. 4*b*.

Figure 4A:
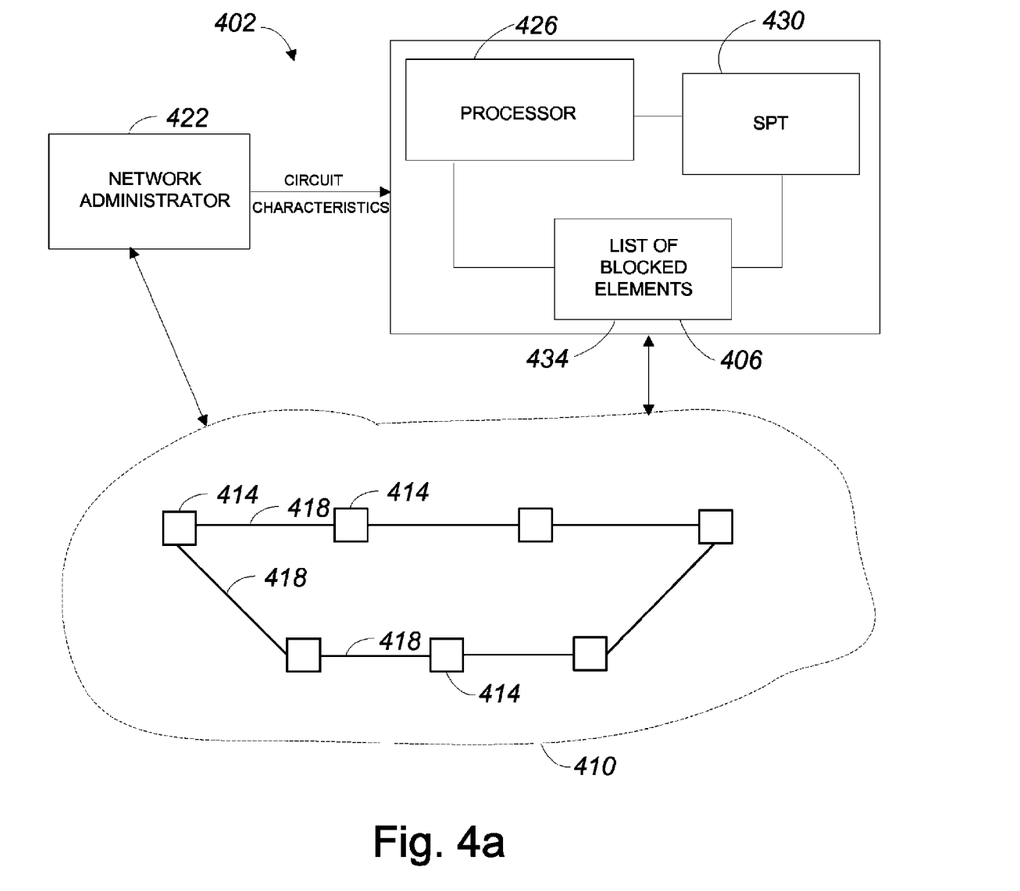
FIG. 4a is a diagrammatic representation of a system in which a path creation algorithm is implemented by a substantially external computing device in accordance with an embodiment of the present invention.

FIG. 4*a* is a diagrammatic representation of a system in which a path creation algorithm is implemented by a substantially external computing device in accordance with an embodiment of the present invention. An overall system 402 includes a computing device 406 and a network 410. Network 410 generally includes elements such as nodes 414 and links 418. Links 418 may include both protected and unprotected links. Computing device 406 is in communication with network 410, and is arranged to accept input, e.g., circuit characteristics, from a user such as a network administrator 422.

Computing device 406 generally includes a processor 426 which is arranged to execute a routing algorithm 430. Although the routing algorithm 430 executed by processor 426 may be substantially any suitable routing algorithm, one particularly suitable routing algorithm is a shortest past first (SPT) algorithm which may use circuit characteristics and constraints to identify a shortest path between a specified starting node and a specified ending node. It should be appreciated, however, that an SPT algorithm is just one example of a suitable routing algorithm 430, and that routing algorithm 430 may be substantially any type of algorithm.

In general, routing algorithm 430 may be embodied in a variety of different forms. For example, routing algorithm 430 may be embodied as a computer program product that stores computer-readable code devices on a memory device, or computer-readable medium, that is associated with a computer. Suitable memory devices include, but are not limited to, a CD-ROM, a DVD, a hard disk, a tape, and a computer disk. Routing algorithm 430 may also be embodied as a data signal embodied in a carrier wave.

Routing algorithm 430 is arranged to compute a primary circuit path between nodes 414 of network 410. Once the primary circuit path is computed, if a network administrator 422 has requested that an alternate circuit path be identified, routing algorithm 430 computes the alternate circuit path. Although network administrator 422 may specify that an alternate circuit path is to be defined, the specification that an alternate circuit path is to be defined may instead be coded into routing algorithm 430.

In one embodiment, when routing algorithm 430 begins to compute an alternate circuit path for the corresponding primary circuit path, routing algorithm 430 compiles a list of blocked elements 434, which may be stored on a memory device associated with computing device 406. List of blocked elements 434 includes elements, e.g., nodes 414 and links 418, of network 410 which are not to be considered or used by routing algorithm 430 in the creation of an alternate circuit path. When nodal diverse constraints are in effect, list of blocked elements 434 may include nodes 414 which are to be considered as being inaccessible to an alternate circuit path. Alternatively, when link diverse constraints are in effect, list of blocked elements 434 may include links 418 which are to effectively inaccessible to an alternate circuit path. Often, links 418 which are protected are also added to list of blocked elements 434.

Once an alternate circuit path is created by routing algorithm 430, the primary circuit path and the alternate circuit path may be implemented with respect to network 410. Implementing the circuit paths may involve sending information from computing device 406 to network 410 which enables nodes 414 to be informed of whether they are part of the primary circuit path or the alternate circuit path. Nodes 414 may also be informed which links 418 to use in transferring information between nodes 414. While nodes 414 may receive information from computing device 410 through a data signal, information may also be provided to nodes 414 through network administrator 422. That is, network administrator 422 may set both the primary circuit path and the alternate circuit path once the paths have been defined using computing device 406.

Figure 4B:
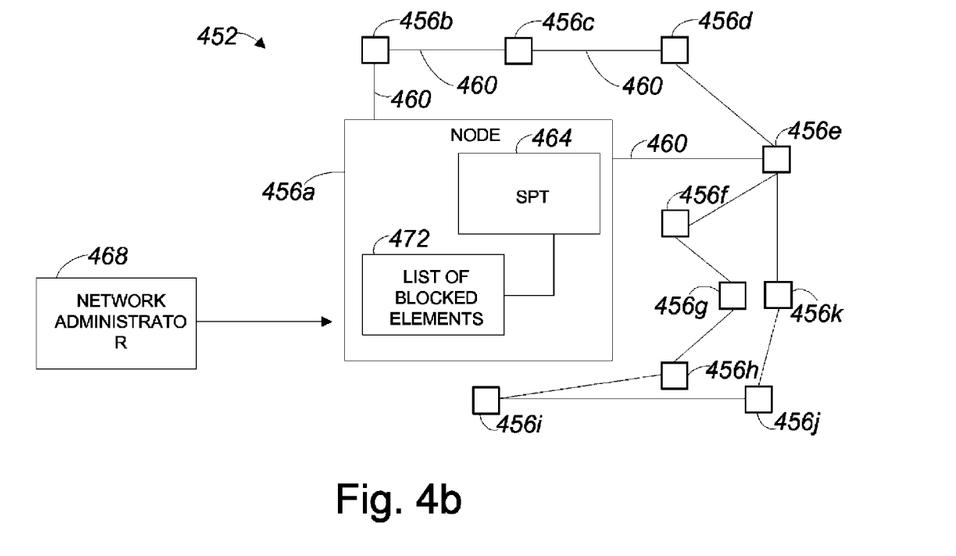
FIG. 4b is a diagrammatic representation of a system in which a path creation algorithm is implemented by a node in accordance with an embodiment of the present invention.

As mentioned above, a routing algorithm or a route generator may be implemented on a node rather than being implemented by a computing device. FIG. 4b is a diagrammatic representation of a system in which a path creation algorithm is implemented by a node in accordance with an embodiment of the present invention. An overall system 452 includes a network of nodes 456 and links 460. At least one node 456 is arranged to execute a routing algorithm 464, which may be an SPT algorithm. It should be understood that substantially any node 456 which may potentially be a starting node of a circuit path or a starting node of a segment of a circuit path may be capable of executing a routing algorithm. Typically, a routing algorithm is executed by a starting node of a circuit path or, in some cases, a segment of the circuit path.

In executing routing algorithm 464, node 456a may take input from a network administrator 468. The input, while substantially minimal, may include, but is not limited to, characteristics expected in a circuit path. Typically, network administrator 468 provides information such as a specification that an alternate circuit path be routed using either a link diverse constraint or a nodal diverse constraint.

Once routing algorithm 464 defines a primary circuit path between two nodes 456, as for example starting node 456a and another node 456, elements of the primary circuit path may be determined to be substantially unavailable for use in a corresponding alternate circuit path. For a nodal diverse constraint, nodes 456 included in the primary circuit path, along with any protected links 460, may be identified in a list of blocked elements 472. On the other hand, for a link diverse constraint, any links 460 included in the primary circuit path, as well with any protected links 460, may be included in list of blocked elements 472. Using list of blocked elements 472 as a guide, routing algorithm 464 may then compute an alternate circuit path.

Figure 5:
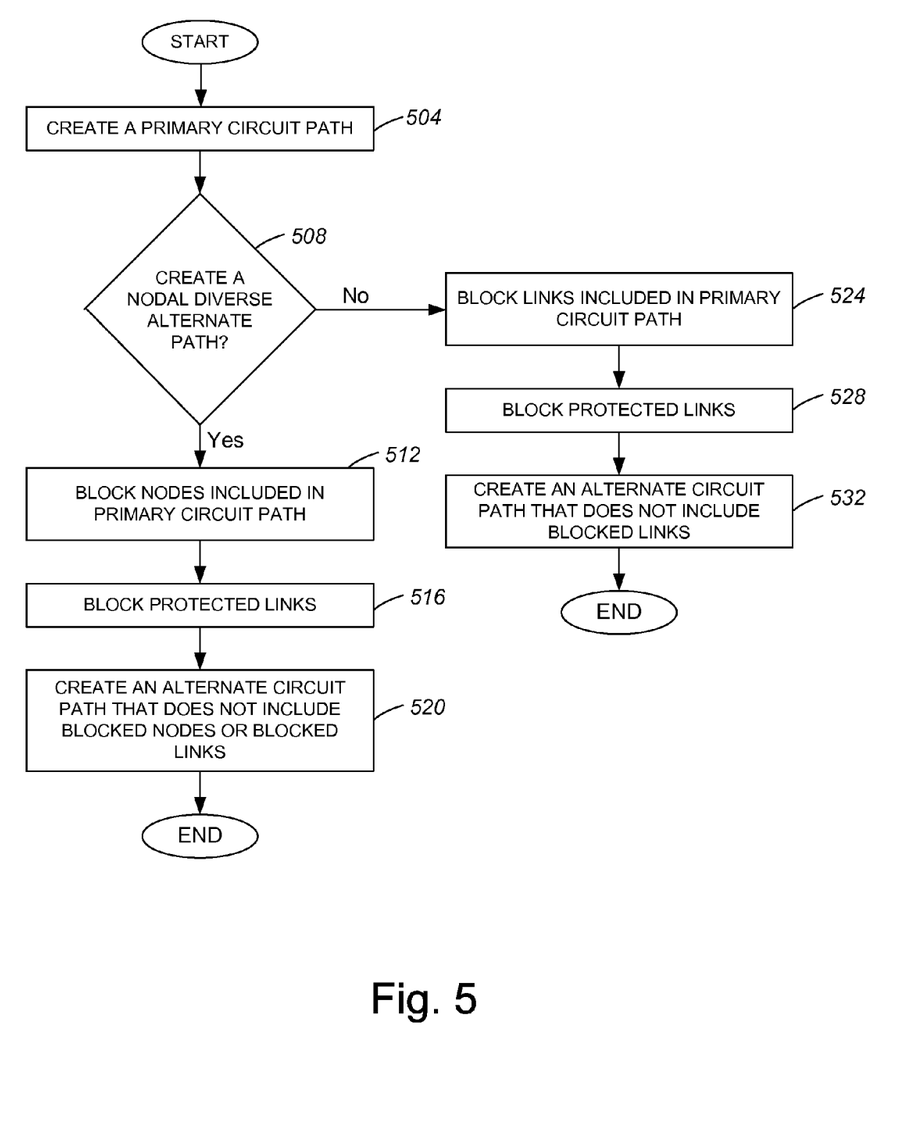
FIG. 5 is a process flow diagram which illustrates the steps associated with computing an alternate circuit path in accordance with an embodiment of the present invention.

With reference to FIG. 5, one process of automatically computing an alternate, or standby, path given specified constraints will be described in accordance with an embodiment of the present invention. A process of automatically computing an alternate path begins at step 504 in which a primary circuit path is created. The primary circuit path may be created using substantially any suitable method. As discussed above with respect to FIGS. 4a and 4b, the primary circuit path may be created by a computer which is in communication with a network, or by a node within a network. In general, the primary circuit path may be created as a protected path or an unprotected path. Although the primary circuit path is often chosen to be the shortest path between a start node and an end node, the primary circuit path may also account for load balancing, in which case the primary circuit path may not be chosen to be the shortest, or least-switched, path between the start node and the end node.

Once the primary circuit path is created between two nodes, an alternate circuit path between the two nodes may then be computed by a computer or by a node. By way of example, for an embodiment in which the primary circuit path is an unprotected path, an alternate path may be created to provide a back up to the primary circuit path, as discussed above. Accordingly, a determination is made in step 508 regarding whether a nodal diverse alternate path is desired. If it is determined that a nodal diverse alternate path is desired, then process flow moves to step 512 in which nodes included in the primary circuit path are blocked from being used in the computation of an alternate path. It should be understood that the start node and the end node of a path are not blocked, as such nodes are effectively the terminating end points of both primary and alternate circuit paths.

Blocking nodes effectively blocks any links between blocked nodes. That is, any links between blocked nodes may not be reached and, hence, are effectively blocked. Hence, a nodal diverse constraint essentially encompasses a link diverse constraint. The blocked nodes may be added to a list of blocked nodes, i.e., blocked network elements, that is accessible to a routing algorithm. In general, adding blocked network elements to a list of blocked network elements involves placing identifiers that identify the blocked network elements in the list. As will be appreciated by those of skill in the art, the start node and the end node are generally not blocked.

For an embodiment in which a primary circuit path includes a VT tunnel, blocking the nodes of the primary circuit path includes blocking the nodes within the VT tunnel. By way of example, when a VT tunnel is to be blocked, the individual physical links and nodes that the tunnel passes through may be identified. These links and nodes may then be added a list of blocked links and a list of blocked nodes, respectively, to effectively ensure that an alternate circuit path does not use the links and the nodes included in the VT tunnel. It should be understood that if the VT tunnel is initiated at the end of an unprotected segment, i.e., has a node in common with an unprotected segment of the primary circuit path, the destination node of the unprotected segment, or the initial node of the VT tunnel, is not blocked since it is needed in the determination of an alternate path segment that corresponds to the unprotected segment. Likewise, if the VT tunnel effectively terminates at the source of an unprotected segment, i.e., the VT tunnel has a terminating node that is the source node of an unprotected segment of the primary path, the terminating node of the VT tunnel is not blocked since it is needed to determine an alternate path segment that corresponds to the unprotected segment.

After the nodes included in the primary circuit path are blocked, protected links, e.g., 1+1 links, may then be blocked in step 516. In the described embodiment, the protected links are ignored and not considered in the computation of a path. Ignoring protected links and, hence, preventing protected links from being included in the computation of an alternate path prevents protected links from accidentally being used to generate an alternate path. As discussed above, alternate paths associated with a SONET system may not include protected links. In step 520, an alternate path that does not include blocked nodes or blocked links is created by a routing algorithm, and the process of computing an alternate path is completed. One process of creating an alternate path with a nodal diverse constraint will be described below with reference to FIG. 6.

Returning to step 508, if it is determined that a nodal diverse alternate path is not to be created, then the indication is that a link diverse path is to be created. In other words, the implication is that an alternate path is to be created which does not include links that are a part of the primary path. Accordingly, process flow proceeds from step 508 to step 524 in which links that are included in the primary path are blocked, e.g., added to a list of blocked elements. In the event that the primary path includes a VT tunnel, then the links within the VT tunnel are also blocked. In step 528, protected links are also blocked. Then, in step 532, an alternate path which does not include any blocked links may be created using substantially any suitable method or routing algorithm. Once the alternate path is created, the process of computing an alternate path is completed.

Figure 6:
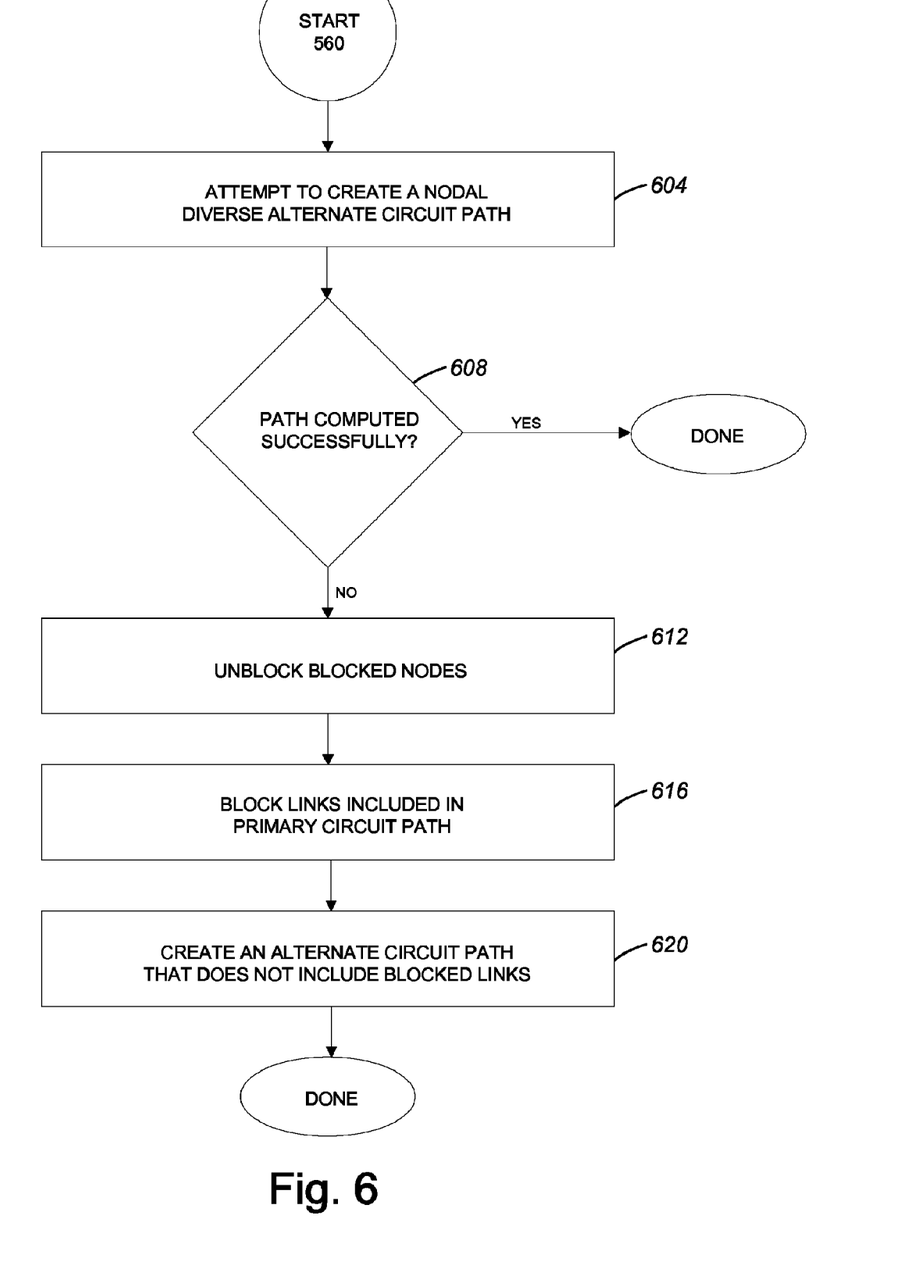
FIG. 6 is a process flow diagram which illustrates the steps associated with creating an alternate circuit path using a nodal diverse constraint, i.e., step 560 of FIG. 5, in accordance with an embodiment of the present invention.

FIG. 6 is a process flow diagram which illustrates the steps associated with creating an alternate path when there are blocked nodes, i.e., step 520 of FIG. 5, in accordance with an embodiment of the present invention. The creation of an alternate path begins in step 604 with an attempt to create a nodal diverse alternate path. Generally, substantially any suitable method may be used in creating the alternate path. As will be appreciated by those skilled in the art, it may not always be possible to create a nodal diverse alternate path, as an intermediate node may effectively be an integral component of a path between two nodes. In other words, it may not be possible to create a circuit path between two nodes that does not pass through a particular node. As such, a determination is made in step 608 regarding whether the attempt to create a nodal diverse alternate path was successful.

If it is determined that a nodal diverse alternate path was successfully created, then the process of creating an alternate path is completed. Alternatively, if it is determined that a nodal diverse path was not successfully created, then the indication is that an alternate path may not be created without using at least one of the blocked nodes. Accordingly, process flow moves from step 608 to step 612 in which the blocked nodes are unblocked, or otherwise returned to the list of nodes which may be used in creating an alternate path.

In the described embodiment, once the blocked nodes are effectively unblocked, links that are included in the primary path are blocked from consideration for use in an alternate circuit path in step 616. As a result, links that are protected and links that are a part of the primary circuit path may both be prevented from being used within an alternate circuit path. After the links are blocked in step 616, an alternate circuit path that does not include blocked links is created in step 620, and the process of creating an alternate path is completed.

Although only a few embodiments of the present invention have been described, it should be understood that the present invention may be embodied in many other specific forms without departing from the spirit or the scope of the present invention. By way of example, an alternate circuit path may be computed without any manual input from a network administrator. Instead, it may be specified within an overall routing algorithm that alternate circuit paths are to be nodal diverse or link diverse. If circuit characteristics are prespecified, then it may not be necessary for the network administrator to provide any input for use in the execution of a routing algorithm.

It should be appreciated that the network elements included in a list of blocked elements will typically be overwritten or reset each time an alternate circuit path is to be created for a newly defined primary circuit path. That is, each primary circuit path created using a routing algorithm will typically have a corresponding list of blocked elements. Hence, after an alternate circuit path is defined, the list of blocked elements used in defining the alternate circuit path may effectively be erased such that a new list of blocked elements may be created when an alternate circuit path for a different primary circuit path is to be generated. Alternatively, the list of blocked elements used in generating an alternate circuit path may be maintained until it becomes necessary to generate a new list of blocked elements in response to a need to create an alternate circuit path for a different primary circuit path.

A list which is effective for identifying blocked elements, or elements which are not to be used in the creation of an alternate circuit path, is arranged to be readily maintained and accessed by a path generator or a route generator. The form of a list may generally be widely varied depending upon the requirements of a particular routing algorithm. For example, a list may contain a simple listing of all blocked elements. Alternatively, a list may effectively be configured in a tabular form such that blocked nodes and protected links, for example, are listed under separate headings. Other suitable formats for a list include, but are not limited to, various array formats.

While the present invention has been described as being suitable for use with respect to a TDM network that is subject to SONET standards, the present invention is suitable for a variety of different networks. Other suitable networks include, but are not limited to, networks that are subject to a synchronous digital hierarchy (SDH) standard. Further, while the methods of the present invention are suitable for UPSRs, the methods may generally be modified for use with other types of switched ring architectures.

In general, the steps associated with methods of computing an alternate path with nodal or link diverse constraints may be widely varied. Steps may be added, removed, altered, or reordered without departing from the spirit or the scope of the present invention. For example, in some situations, it may not be possible to create an alternate path that does not include a link that is blocked. In order to account for such cases, a process of computing an alternate path may include generating a warning that warns a system associated with a start node that an alternate path may not be created. Alternatively, such cases may be accounted for by enabling a blocked link to be included in an alternate path, and transmitting a warning that warns of the effectively redundant use of a link.

When an attempt to create a nodal diverse alternate circuit path has not been successful, in the described embodiment, all blocked nodes are effectively unblocked and made available for use in creating an alternate circuit path. In another embodiment, rather than unblocking all blocked nodes, only selected blocked nodes may instead by unblocked. It should be appreciated that it may also be possible to cycle through all blocked nodes such that potential alternate circuit paths may be created in which different nodes are unblocked. An actual alternate circuit path may then be chosen, for example, based upon the alternate circuit path which has the fewest nodes in common with the corresponding primary circuit path. Therefore, the present examples are to be considered as illustrative and not restrictive, and the invention is not to be limited to the details given herein, but may be modified within the scope of the appended claims.

The invention claimed is:

1. A method comprising:
receiving an input for either a nodal diverse constraint or a link diverse constraint for an alternate circuit path between a first node and a node in a network, the network including a plurality of elements that includes a protected link;
generating a primary circuit path between the first node and the second node, the primary circuit path including a first element and a set of elements selected from the plurality of elements;
selectively generating a nodal diverse alternate circuit path in response to receiving a nodal diverse constraint input or a link diverse alternate circuit path in response to receiving a link diverse constraint input;
storing a list in a memory, the list identifying the first element, the set of elements and the protected link as being inaccessible for use in generating an alternate circuit path; and
generating the alternate circuit path between the first node and the second node using the list and such that the alternate circuit path does not include the first element, the set of elements and the protected link identified by the list.

2. The method of claim 1, wherein receiving comprises receiving the nodal diverse constraint input and the first element is a node.

3. The method of claim 1, wherein receiving comprises receiving the link diverse constraint as input and the first element is a link.

4. The method of claim 1, wherein receiving comprises receiving the nodal diverse constraint that specifies that any nodes in the primary circuit path between the first node and the second node are not included in the alternate circuit path and receiving the link diverse constraint that specifies that any links in the primary circuit path between the first node and the second node are not included in the alternate circuit path.

5. The method of claim 1, and further comprising generating the alternate circuit path using the list such that the alternate circuit path includes a second element included in the plurality of elements and does not include the first element and without regard to a failure of the first element.

6. The method of claim 1, wherein generating the primary circuit path and generating the alternate circuit path are such that the primary circuit path and the alternate circuit path are nodal diverse paths in which the primary circuit path and the alternate circuit path have no common nodes between the first node and the second node, and wherein when the primary circuit path and the alternate circuit path are the nodal diverse paths, the first element is a node.

7. The method of claim 1, wherein generating the primary circuit path and generating the alternate circuit path are such that the primary circuit path and alternate circuit path are link diverse paths in which the primary circuit path and the alternate circuit path share no links between the first node and the second node, and wherein when the primary circuit path and the alternate circuit path are the link diverse paths, the first element is a link.

8. The method of claim 1, wherein receiving the input comprises receiving circuit characteristics for the primary circuit path and the alternate circuit path, and wherein generating the primary circuit path is based on the circuit characteristics.

9. The method of claim 1, wherein generating the alternate circuit path comprises accessing the stored list and identifying the first element stored in the list as being blocked from use in generating the alternate circuit path.

10. A method comprising:
receiving an input for either a nodal diverse constraint or a link diverse constraint for an alternate circuit path between a source node and a destination node in a network, the network including a plurality of links;
generating a first circuit path between the source node and the destination node, the first circuit path including a first link included in the plurality of links;
identifying the first link and generating a first identifier that identifies the first link;
selectively generating a nodal diverse alternate circuit path in response to receiving a nodal diverse constraint input or a link diverse alternate circuit path in response to receiving a link diverse constraint input;
storing a list in a memory, the list including a plurality of identifiers arranged to identify selected links included in the plurality of links including the first identifier;
storing the first identifier in the list;
generating a second circuit path between the source node and the destination node using the list and based on the received input, wherein the second circuit path includes a second link included in the plurality of links and does not include the selected links identified by the plurality of identifiers included in the list, and wherein generating the second circuit path is without regard to a failure of any of the selected links identified by the plurality of identifiers included in the list.

11. The method of claim 10, wherein the selected links included in the plurality of links include a protected link.

12. The method of claim 10, wherein receiving comprises receiving the nodal diverse constraint that specifies that any nodes in the first circuit path between the source node and the destination node are not included in the second circuit path and receiving the link diverse constraint that specifies that any links in the first circuit path between the source node and the destination node are not included in the second circuit path.

13. The method of claim 10, wherein receiving the input comprises receiving circuit characteristics for the first circuit path and the second circuit path, and wherein generating the first circuit path is based on the circuit characteristics.

* * * * *